US012292960B2

(12) United States Patent
Tripathi et al.

(10) Patent No.: US 12,292,960 B2
(45) Date of Patent: *May 6, 2025

(54) AUTOMATION OF WORKLOADS INVOLVING APPLICATIONS EMPLOYING MULTI-FACTOR AUTHENTICATION

(71) Applicant: Automation Anywhere, Inc., San Jose, CA (US)

(72) Inventors: Anoop Tripathi, Saratoga, CA (US); Kazuya Tanikawa, Tokyo (JP); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 17/988,660

(22) Filed: Nov. 16, 2022

(65) Prior Publication Data
US 2023/0082185 A1 Mar. 16, 2023

Related U.S. Application Data

(63) Continuation of application No. 16/779,117, filed on Jan. 31, 2020, now Pat. No. 11,514,154.

(51) Int. Cl.
*G06F 21/45* (2013.01)
*G06F 21/31* (2013.01)
*G06F 8/60* (2018.01)

(52) U.S. Cl.
CPC ............ *G06F 21/45* (2013.01); *G06F 21/31* (2013.01); *G06F 8/60* (2013.01); *G06F 2221/2115* (2013.01)

(58) Field of Classification Search
CPC .. G06F 21/45; G06F 21/32; G06F 8/60; G06F 2221/2115
See application file for complete search history.

(56) References Cited

U.S. PATENT DOCUMENTS

| 5,949,999 A | 9/1999 | Song et al. |
| 5,983,001 A | 11/1999 | Boughner et al. |

(Continued)

FOREIGN PATENT DOCUMENTS

| EP | 3133539 | 2/2017 |
| EP | 3675008 | 7/2020 |

(Continued)

OTHER PUBLICATIONS

NPL Search Terms (Year: 2024).*

(Continued)

*Primary Examiner* — Syed A Zaidi

(57) ABSTRACT

A robotic process automation (RPA) system provides bots that interact with and provide user credentials to applications, such as for multi-factor authentication (MFA). First user credentials associated with MFA are retrieved by the bots from credential storage. Second user credentials that correspond to questions posed to a user of an application are retrieved from credential storage. Second user credentials that correspond to a one-time password are generated by the RPA system. The second user credentials may also be generated by a third-party authentication service that provides the credentials via a secondary channel such as email or SMS, which are then retrieved for presentation to the application.

24 Claims, 4 Drawing Sheets

(56) References Cited

U.S. PATENT DOCUMENTS

| | | |
|---|---|---|
| 6,118,939 A | 9/2000 | Nack |
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,783,135 B2 | 8/2010 | Gokturk |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Fotev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,819,253 B2 * | 8/2014 | Simeloff ............ H04L 63/08 709/229 |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 8,966,458 B2 | 2/2015 | Asai |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,251,413 B2 | 2/2016 | Meler |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,934,063 B2 | 4/2018 | Kaina |
| 9,934,129 B1 | 4/2018 | Budurean |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,542,030 B2 * | 1/2020 | Oberheide ............ G06F 21/577 |
| 10,552,540 B2 | 2/2020 | Marascu et al. |
| 10,592,738 B2 | 3/2020 | Northrup |
| 10,643,246 B1 | 5/2020 | Suprasadachandran |
| 10,654,166 B1 | 5/2020 | Hall |
| 10,706,218 B2 | 7/2020 | Milward et al. |
| 10,706,228 B2 | 7/2020 | Buisson |
| 10,713,068 B1 | 7/2020 | Zohar |
| 10,857,786 B2 | 12/2020 | Korthuis |
| 10,936,807 B1 | 3/2021 | Walters |
| 10,963,731 B1 | 3/2021 | Sarkar |
| 10,970,109 B1 | 4/2021 | Berenstein |
| 11,099,972 B2 | 8/2021 | Puszkiewicz |
| 11,176,443 B1 | 11/2021 | Selva |
| 11,182,178 B1 | 11/2021 | Singh et al. |
| 11,182,604 B1 | 11/2021 | Methaniya |
| 11,243,803 B2 | 2/2022 | Anand et al. |
| 11,263,391 B2 | 3/2022 | Potts |
| 11,348,353 B2 | 5/2022 | Sundell et al. |
| 11,494,227 B2 | 11/2022 | George |
| 11,500,952 B1 * | 11/2022 | Gupta ................. G06F 16/9537 |
| 11,513,670 B2 | 11/2022 | Tripathi |
| 11,614,731 B2 | 3/2023 | Anand et al. |
| 11,642,783 B2 | 5/2023 | Han et al. |
| 11,775,321 B2 | 10/2023 | Singh et al. |
| 11,775,339 B2 | 10/2023 | Anand et al. |
| 11,775,814 B1 | 10/2023 | Anand et al. |
| 11,782,734 B2 | 10/2023 | Ginoya et al. |
| 11,820,020 B2 | 11/2023 | Goyal et al. |
| 12,002,245 B2 | 6/2024 | Srivastava |
| 2002/0029232 A1 | 3/2002 | Bobrow et al. |
| 2002/0129039 A1 | 9/2002 | Majewsku |
| 2003/0033590 A1 | 2/2003 | Leherbauer |
| 2003/0101245 A1 | 5/2003 | Srinivasan et al. |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0122906 A1 * | 6/2004 | Goodman ............ H04L 67/2876 709/204 |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0033777 A1 | 2/2005 | Moraes |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0089101 A1 | 4/2007 | Romanovskiy |
| 2007/0101291 A1 | 5/2007 | Forstall et al. |
| 2007/0112574 A1 | 5/2007 | Greene |
| 2007/0156677 A1 | 7/2007 | Szabo |
| 2007/0172063 A1 * | 7/2007 | Biggs ..................... H04L 51/04 380/255 |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0310625 A1 | 12/2008 | Vanstone |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0077475 A1 | 3/2010 | Deschenes |
| 2010/0100605 A1 | 4/2010 | Allen et al. |
| 2010/0106671 A1 | 4/2010 | Li et al. |
| 2010/0138015 A1 | 6/2010 | Colombo et al. |

(56) References Cited

U.S. PATENT DOCUMENTS

| | | |
|---|---|---|
| 2010/0235433 A1 | 9/2010 | Ansari et al. |
| 2010/0251163 A1 | 9/2010 | Keable |
| 2011/0022578 A1 | 1/2011 | Fotev |
| 2011/0055484 A1 | 3/2011 | Eichenberger |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258195 A1 | 10/2011 | Welling |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0301935 A1 | 11/2013 | Xue |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0282125 A1 | 9/2014 | Duneau |
| 2014/0379666 A1 | 12/2014 | Bryon |
| 2015/0082280 A1 | 3/2015 | Betak et al. |
| 2015/0206139 A1 | 7/2015 | Lea |
| 2015/0235193 A1 | 8/2015 | Cummings |
| 2015/0290795 A1 | 10/2015 | Oleynik |
| 2015/0301926 A1 | 10/2015 | Giannelos |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078366 A1 | 3/2016 | Kakhandiki |
| 2016/0078368 A1 | 3/2016 | Kakhandiki et al. |
| 2017/0091615 A1 | 3/2017 | Liu |
| 2017/0221032 A1* | 8/2017 | Mazed ................. H10H 20/856 |
| 2017/0270431 A1 | 9/2017 | Hosabettu |
| 2017/0352041 A1 | 12/2017 | Ramamurthy |
| 2018/0113781 A1 | 4/2018 | Kim |
| 2018/0144042 A1 | 5/2018 | Sheng |
| 2018/0176416 A1 | 6/2018 | Ewans |
| 2018/0210824 A1 | 7/2018 | Kochura |
| 2018/0218429 A1 | 8/2018 | Guo et al. |
| 2018/0267885 A1 | 9/2018 | Budurean |
| 2018/0275835 A1 | 9/2018 | Prag |
| 2018/0276462 A1 | 9/2018 | Davis |
| 2018/0321955 A1 | 11/2018 | Liu |
| 2018/0322403 A1 | 11/2018 | Ron |
| 2018/0349730 A1 | 12/2018 | Dixon |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0066012 A1* | 2/2019 | Abell ................. H04L 63/102 |
| 2019/0075169 A1* | 3/2019 | Behunin ................. H04L 67/14 |
| 2019/0095440 A1 | 3/2019 | Chakra |
| 2019/0114370 A1 | 4/2019 | Cerino |
| 2019/0126463 A1 | 5/2019 | Purushothaman |
| 2019/0130094 A1* | 5/2019 | Votaw ................. G06F 21/552 |
| 2019/0141596 A1 | 5/2019 | Gay |
| 2019/0188462 A1 | 6/2019 | Nishida |
| 2019/0205636 A1 | 7/2019 | Saraswat |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0065384 A1 | 2/2020 | Costello |
| 2020/0074070 A1* | 3/2020 | Boodaei ................. G06F 21/33 |
| 2020/0097742 A1 | 3/2020 | Kumar et al. |
| 2020/0104350 A1 | 4/2020 | Allen |
| 2020/0125635 A1 | 4/2020 | Nuolf |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0206920 A1 | 7/2020 | Ma |
| 2020/0249964 A1 | 8/2020 | Fernandes |
| 2020/0257764 A1 | 8/2020 | Reisswig |
| 2020/0273078 A1 | 8/2020 | Xu |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2020/0364291 A1 | 11/2020 | Bentabet |
| 2020/0410082 A1* | 12/2020 | Sharieh ................. H04L 63/10 |
| 2021/0042516 A1 | 2/2021 | Panakkal |
| 2021/0049128 A1 | 2/2021 | Kernick |
| 2021/0067492 A1 | 3/2021 | Mastracci |
| 2021/0107140 A1 | 4/2021 | Singh |
| 2021/0141497 A1 | 5/2021 | Magureanu |
| 2021/0216334 A1 | 7/2021 | Barrett |
| 2021/0248153 A1 | 8/2021 | Sirangimoorthy |
| 2021/0279166 A1 | 9/2021 | Peng |
| 2021/0333983 A1 | 10/2021 | Singh |
| 2021/0391004 A1 | 12/2021 | Yudanov |
| 2022/0038445 A1* | 2/2022 | LeClair ................. H04L 63/083 |
| 2022/0245936 A1 | 8/2022 | Valk |
| 2022/0405094 A1 | 12/2022 | Farquhar |
| 2022/0413997 A1 | 12/2022 | Shi |
| 2023/0052190 A1 | 2/2023 | Goyal et al. |
| 2023/0053260 A1 | 2/2023 | Goyal et al. |
| 2023/0214239 A1 | 7/2023 | Singh |
| 2023/0419711 A1 | 12/2023 | Ramnath |
| 2024/0056479 A1* | 2/2024 | Senecal ................. H04L 63/166 |

FOREIGN PATENT DOCUMENTS

| | | |
|---|---|---|
| WO | 2019/092672 A2 | 5/2019 |
| WO | 2022/076488 | 4/2022 |

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deplying and managing Web services: issues, solutions, and directions, 36 pages (Year: 2008).

(56) References Cited

OTHER PUBLICATIONS

Zhifang et al., Test automation on moble device, May 2010, 7 pages.
Non-Final Office Action for U.S. Appl. No. 17/230,492, mailed Oct. 14, 2022.
Notice of Allowance for U.S. Appl. No. 16/398,532, mailed Oct. 23, 2022.
Non-Final Office Action for U.S. Appl. No. 16/876,530, mailed Sep. 29, 2020.
Final Office Action for U.S. Appl. No. 16/876,530, mailed Apr. 13, 2021.
Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
"Ren, Shaoqing et al., Faster r-cnn: Towards real0time object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey, International Journal on Document Analysis and Recognition", vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv: 1512.03385 (2015).
FaceNet: A Unified Embedding for Face Recognition and Clustering, by F. Schroff, D. Kalenichenko, J. Philbin, arXiv:1503.03832 (2015).
Luqman, et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Notice of Allowance for U.S. Appl. No. 18/126,935, mailed Jan. 10, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Non-Final Office Action for U.S. Appl. No. 17/160,082, mailed Feb. 15, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.
Non-Final Office Action for U.S. Appl. No. 16/779,117, mailed Jan. 12, 2022.
Notice of Allowance for U.S. Appl. No. 16/779,117, mailed Aug. 10, 2022.
Non-Final Office Action for U.S. Appl. No. 18/094,305, mailed May 9, 2024.
Final Office Action for U.S. Appl. No. 17/160,084, mailed May 16, 2024.
Non-Final Office Action for U.S. Appl. No. 18/218,009, mailed May 20, 2024.
Final Office Action for U.S. Appl. No. 17/160,080, mailed Jun. 12, 2024.
Notice of Allowance for U.S. Appl. No. 17/389,300, mailed Jun. 27, 2024.
Non-Final Office Action for U.S. Appl. No. 17/160,082, filed Jul. 24, 2024.
Final Office Action for U.S. Appl. No. 18/094,305, mailed Jul. 29, 2024.
Non-Final Office Action for U.S. Appl. No. 18/103,331, mailed Aug. 15, 2024.
Notice of Allowance for 16/458,139, mailed Sep. 11, 2024.
Notice of Allowance for 16/458,138, mailed Sep. 16, 2024.
Notice of Allowance for U.S. Appl. No. 17/160,082, mailed Sep. 18, 2024.
Notice of Allowance for 16/398,532, mailed Oct. 23, 2022.
Non-Final Office Action for U.S. Appl. No. 17/988,660, mailed Sep. 25, 2022.
Non-Final Office Action for U.S. Appl. No. 17/160,080, mailed Oct. 16, 2024.

* cited by examiner

AUTOMATION OF WORKLOADS INVOLVING APPLICATIONS EMPLOYING MULTI-FACTOR AUTHENTICATION

CROSS REFERENCE TO RELATED APPLICATION

This application is a continuation of U.S. patent application Ser. No. 16/779,117, filed Jan. 31, 2020, and entitled "AUTOMATION OF WORKLOADS INVOLVING APPLICATIONS EMPLOYING MULTI-FACTOR AUTHENTICATION," the content of which is hereby incorporated by reference.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

When automating human tasks to use applications secured by multi-factor authentication (MFA), automation tools require additional factors other than a login identification and a password for login. There are different methods of MFA. While the form of the additional required factor varies, all MFA techniques require that the additional factor involve a credential or configuration to be first exchanged between the user and the application, and then be used based on the protocol defined by the selected MFA method. This requirement has typically restricted automation from being employed with applications employing MFA.

SUMMARY

A robotic process automation (RPA) system provides bots that interact with and provide user credentials to applications, such as for multi-factor authentication (MFA). A first user credential associated with MFA is retrieved from credential storage. A second user credential that corresponds to questions posed to a user of an application is retrieved from credential storage. A second user credential that corresponds to a one-time password is generated by the RPA system from a security key stored in the credential storage. The second user credential may also be generated by a third party authentication service and is retrieved by the bot via a secondary channel such as email where the bot employs the user credential to access an email account associated with the user to retrieve the second user credential. The secondary channel may be an SMS message where the user has configured their mobile device with an application that recognizes the SMS message and provides the code in the SMS message to the RPA system which then provides the code to the bot.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. Elements designated with reference numbers ending in a suffix such as .1, .2, .3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
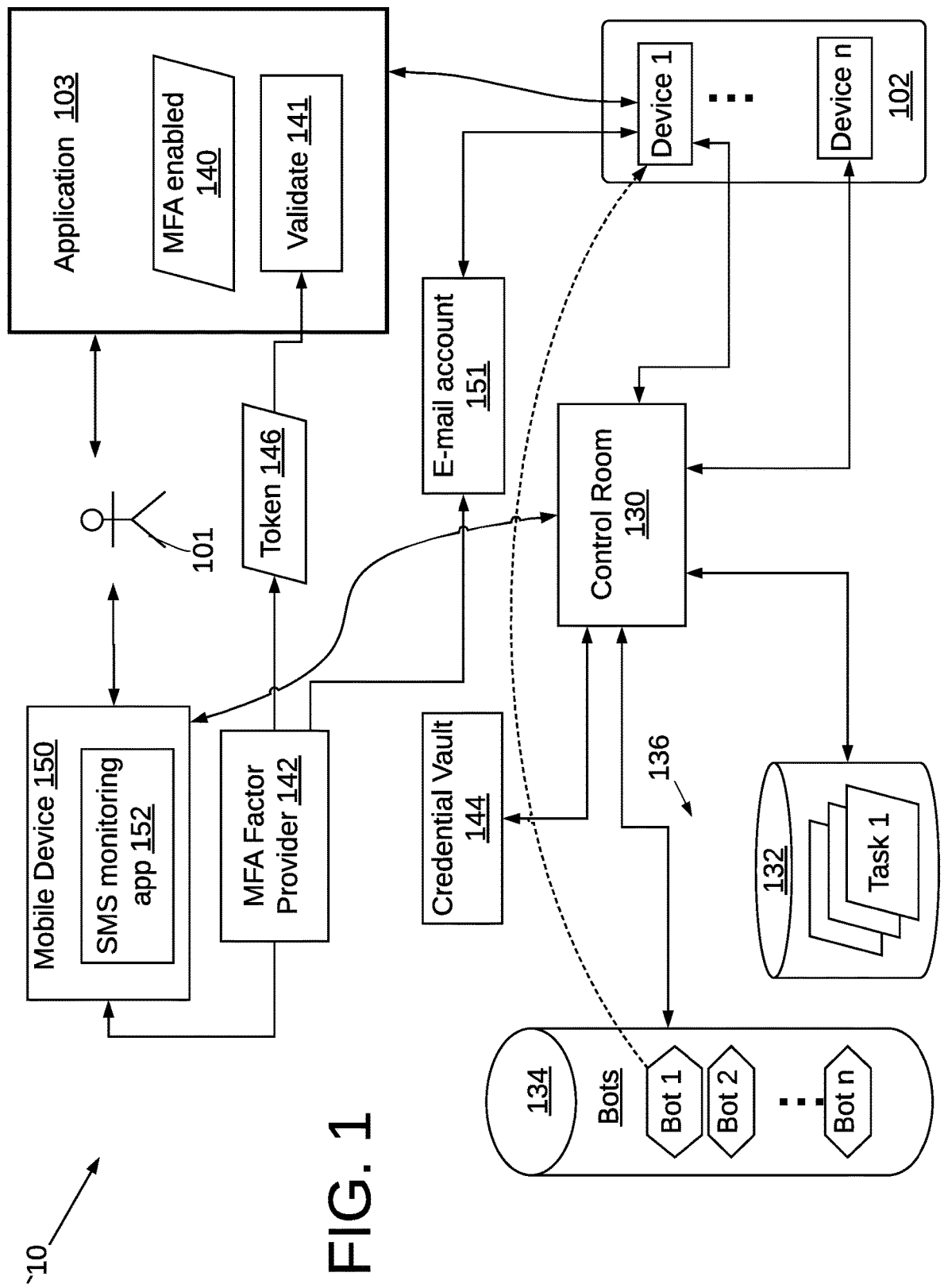
FIG. 1 is a high-level block diagram of an embodiment of an RPA system with multi-factor authentication support.

In FIG. 1, a user 101 interacts via a device 102 with an application 103, which may take a form such as a desktop-based application or a web-based application. A locally stored application 103 executes directly on device 102, which may take a form such as a personal computer, tablet, or other computing device. A web-based application 103 executes partially or entirely on a remote device and interacts with user 101 via a conventional browser. The application 103 may employ Multi-Factor Authentication (MFA) to increase information security.

MFA is an authentication method in which a computer user is granted access only after successfully presenting two or more pieces of evidence (or factors) to an authentication mechanism. The secondary (or tertiary) factors may fall into any one of three categories. First there is knowledge (something the user and only the user knows). An example of this is posing a question to the user, the answer to which only the user is likely to know. Second, is possession—something the user and only the user has. An example of this is a Time Based One-Time Password (TOTP) which is provided only to the user and which is valid for a brief period of time. The difference from knowledge is that the value sent to application is not the credential itself, but something generated from the credential. Third, is interaction where the secondary credential to be sent to an application is provided from the application via a communication method which only the user can access. An example of this is a One-Time Password (OTP) sent to a user via email.

In FIG. 1, a robotic process automation system 10 is also shown. The RPA system 10 includes data storage, seen generally at 136 which stores a plurality of sets of task processing instructions 134. Each set of task processing instructions 134 implements a software robot, also referred to as a bot (seen as Bot 1, Bot 2, . . . , Bot n) which is operable to interact at a user level with one or more designated user level application programs, such as application 103. As used herein, the term "bot" is generally synonymous with the term software robot. In certain contexts, as will be apparent to those skilled in the art in view of the present disclosure, the term "bot runner" refers to a device (virtual or physical), having the necessary software capability, on which a bot will execute or is executing, such as for example a device 102 loaded with and executing a bot 134. The data storage 136 also stores a plurality of work items 132, where each work item 132 is stored for subsequent processing by executing a corresponding set of task processing instructions 134 (also referred to as a bot which implements each set of task processing instructions). A Control Room, seen generally at 130, is operatively coupled to the data storage 136 and is configured to execute instructions that when executed cause the RPA system 10 to respond to a request from a client device 102 that is issued by a user 101 to act as a server to provide to the client device 102 the capability to perform an automation task to process a work item from the plurality of work items 132. The user 101 interacts with the Control Room 130 to schedule automation tasks to be performed on one or more devices 102 as if the user 101 were manually interacting with the necessary application program(s) and the operating system of the devices 102 to perform the tasks directly. The Control Room 130 in conjunction with credential vault 144 holds all software application license and user information. The Control Room 130 also tracks all bots that have been deployed and knows the status of all deployed bots.

Each client device 102 may take a variety of forms such as a physical machine, for example, a desktop computer, laptop computer or tablet. Each client device 102 may also be a virtual device such as provided by conventional virtualization software which permits multiple operating system sessions to be run on a single computer. Each client device 102 may have applications loaded thereon on local storage.

Some or all of the bots 134 may in certain embodiments be located remotely from the Control Room 130. Moreover, any of the devices 102 may also be located remotely from the Control Room 130. The bots 134 and the tasks 132 are shown in separate containers for purposes of illustration but they may be stored in separate or the same device(s), or across multiple devices. The Control Room 130 performs user management functions, source control of the bots 134, along with providing a dashboard that provides analytics and results of the bots 134, performs license management of software required by the bots 134 and manages overall execution and management of scripts, clients, roles, credentials, and security etc. The major functions performed by the Control Room 130 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the Control Room; (vi) task scheduler—permits scheduling tasks which need to be executed on different clients at any particular time; (vii) credential management—permits password management; and (viii) security: management—permits rights management for all user roles. The Control Room 130 is shown generally for simplicity of explanation. Multiple instances of the Control Room 130 may be employed where large numbers of bots are deployed to provide for scalability of the RPA system 10.

The centralized credential vault (CV) 144 operates to securely store all credentials and provision them to bots on an on-demand basis. In one embodiment, the CV 144 implements National Institute of Standards and Technology (NIST) security and privacy controls IA-2 to uniquely identify and authenticate organizational users (or processes acting on behalf of organizational users). Since sensitive credentials need not be stored in bots or on bot runner systems, the CV 144 facilitates a logical separation of credentials from the bots. CV 144 variables are created from Control Room 130 and are instantly available to all the bot creators and bot runners registered with the respective Control Room 130. The CV 144 adds flexibility and dynamic character to bots since only the credential references are present in the bots and not the credentials. When bots are moved from one environment to another environment, absolutely no change is needed in bots. Bots can seamlessly pick up the credential values applicable for the new environment from the Control Room 130 of that environment. Additionally, the Control Room 130 automatically stores configuration related sensitive data into the CV 144 by default. Additional details of the credential vault 144 are described in U.S. patent application Ser. No. 15/957,917 entitled "ROBOTIC PROCESS AUTOMATION SYSTEM AND METHOD WITH SECURE CREDENTIAL VAULT" which is assigned to the assignee of the present application and which is hereby incorporated by reference in its entirety.

The disclosed embodiments permit the system 10 to deploy bots 134 that interact with applications, such as application 103, that employ MFA, to permit tasks employing MFA enabled applications to be automated with bots 134. Without the RPA system 10 disclosed herein, use of applications that employ MFA cannot be automated, or a user 101 needs to disable MFA on the target application, which leads to lower security.

Figure 2:
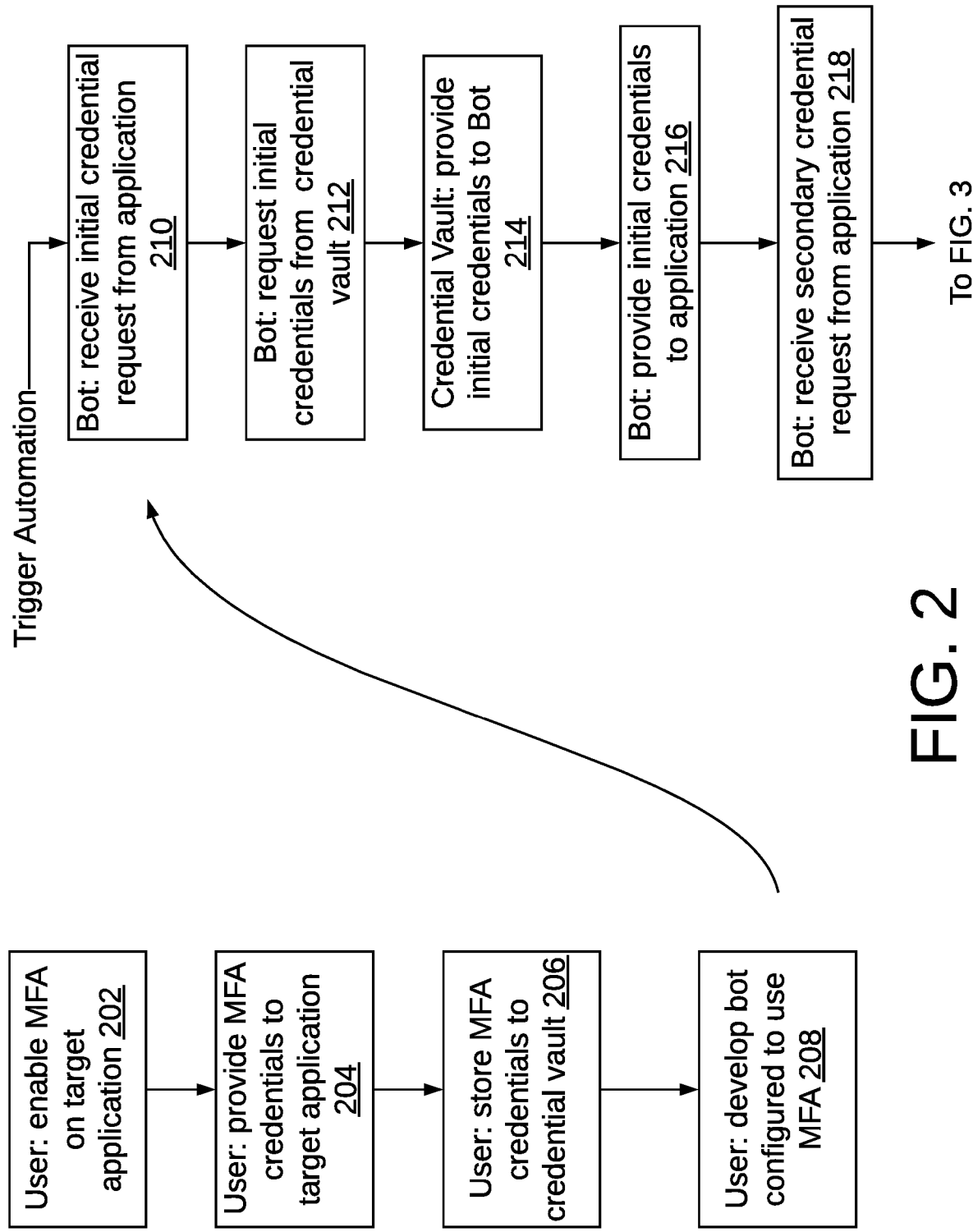
FIG. 2 is a flowchart illustrating operation of an embodiment of multi-factor authentication.

Operation of the MFA feature of the system 10 is described with reference to FIGS. 1 and 2. To permit automation of an application 103 that employs MFA, the MFA feature is enabled 140 on the application 103 (202) and the user 101 has provided their credential information (204) to the application 103. The credential information will include the user 101's primary credentials, such as the login ID and password. The user 101 also interacts with the RPA system 10 to store their credentials (206) associated with application 101 to the credential vault 144 via Control Room 130. A bot 134 is developed (208) to interact with the application 103 and the MFA feature of the application 103. The MFA Factor Provider 142 may be a commercially available service that the application 103 is configured to interact with. The MFA Factor Provider 142 may provide to the application 103 a secondary (and tertiary etc.) authentication requirement, by way of token 146 which is fulfilled by a user 101 or a bot 134 acting on behalf of a user 101. For example, the MFA Factor Provider 142 may be of a type as provided by identity and access management services such as, for example, Microsoft Azure or Okta. The MFA Factor Provider 142 may require any one of a number of secondary authentications, as configured via the application 103, such as an answer to one or more questions previously provided by the user 101. Secondly, the MFA Factor provider 142 may be configured to require a one-time password. Thirdly, the MFA Factor provider 142 may be configured to require a security code provided by the MFA Factor Provider 142 to the user via a secondary channel such as to a user email account or an SMS message provided to a user's mobile device 150.

Subsequently, when the bot 134 that has been coded to respond to a request for MFA, such as Bot 1 executing on Device 1, the bot 134 operates with the credentials of a user, such as user 101, to perform operations with the user 101's credentials as if the user were performing the operations which the bot 134 has been coded to perform. The bot 134 responds to a request by the application 103 for a first set of credentials corresponding to those of user 101 (210), such as a username and password. The bot 134, which has been provided with RPA system credentials of user 101 employs the RPA system credentials of user 101 to access credential vault 144 (212) for user 101's first set of credentials corresponding to application 103 to provide such credentials to application 103 (216) which are then validated by validate module 141 of application 103. In some embodiments the foregoing described request for the user's first set of credentials may be generated by the MFA Factor Provider 142 which the application may then provide to the bot 134. Once the application has received a first set of credentials corresponding to the expected credentials for user 101, the MFA Factor Provider 142 will generate a request for second credentials for user 101 in connection with application 103 to application 103. This request will be provided by application 103 to bot 134 (218) which will then provide the second credentials for user 101 in accordance with the second credentials specified for application 103 by user 101.

Figure 3:
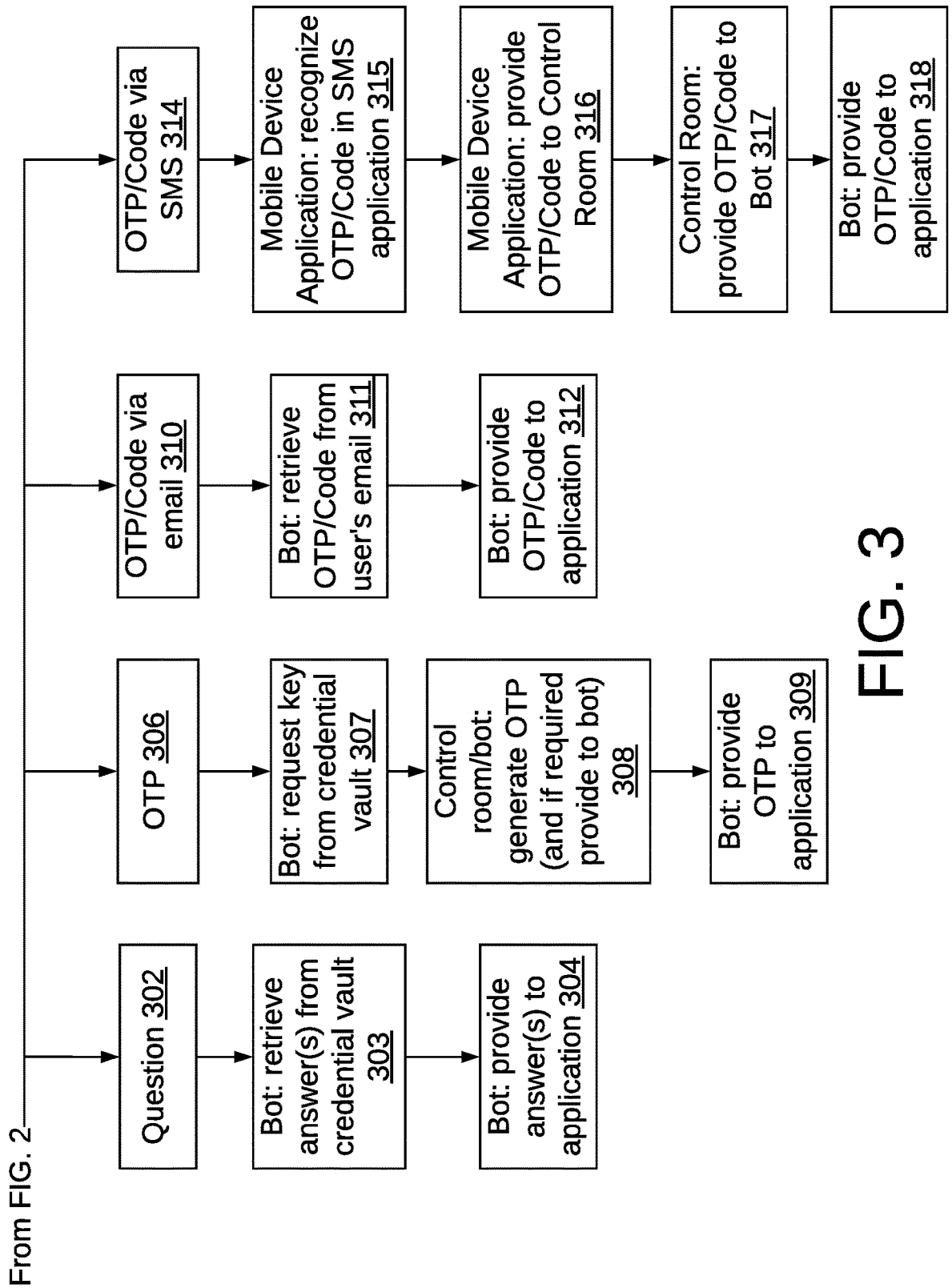
FIG. 3 is a flow diagram illustrating operation of second factor authentication.

The second credentials for user 101 for application 103 may be one of several types, four of which are shown in FIG. 3. The second credentials for user 101 for application 103 may be one or more questions generated by MFA Factor Provider 142 (302). The bot 134 will be encoded to recognize such second credentials and will retrieve the answers from credential vault 144 (303) and provide such second credentials to the application 103 (304). The second credentials for user 101 for application 103 may be a One-Time Password (OTP) which in one embodiment is generated by the control room 130 which retrieves a key stored in the credential vault 144 (306) and generates the OTP with the retrieved key (308). In another embodiment, the OTP is generated by the requesting bot 134 which retrieves the key stored in the credential vault 144 (306) and generates the OTP with the retrieved key (308). The control room 130 and/or the bot 134 is programmed to generate a Time-based OTP (TOTP) using a TOTP Security Key stored in the credential vault. In one embodiment this is based on an algorithm defined in RFC6238 by the Internet Engineering Task Force, which may be found at tools.ietf.org. In this case, the TOTP Security Key (usually 16 length alphabetic characters. e.g. "EGDBYDSIFLBYEKLQ") is the credential information stored in the credential vault 144, and the secondary credential provided to the bot 134 to be sent to the application 103 would be a TOTP code (usually 6 digits, e.g. "385934").

The second credentials may be a code generated by the MFA Factor Provider 142 and provided to an account or device associated with the user 101 such as by way of an email message to an email account of the user 101 (310) or by way of an SMS message provided to a mobile device 150 of the user 101 (314). If the second factor authentication is a code sent via email by the MFA Factor Provider 142 to an email account 151 provided by user 101, the bot 134, which receives the request via application 103, connects to the user 101's email mailbox and retrieves the one-time password sent from the MFA Factor Provider 142 (311) and provides the retrieved password to the application 103 (312). If the code is provided by the MFA Factor Provider 142 to the user's mobile device 150 via SMS, then an application 152 installed under user 101's permission to the mobile device 150 operates to recognize the received SMS by monitoring received SMS messages on the device 150 (315). The application 152 is one embodiment is provided by the RPA system 10, instead of by a third-party, to ensure security of the user's environment on the device 150 and other devices and applications with which the device 150 interacts. The application 152 provides the received OTP or code to the control room 130 (316) which provides it to the bot 134 (317) which then proceeds to provide the received OTP or code to the application 103 (318) to satisfy the second factor generated by the MFA Factor Provider 142.

Figure 4:
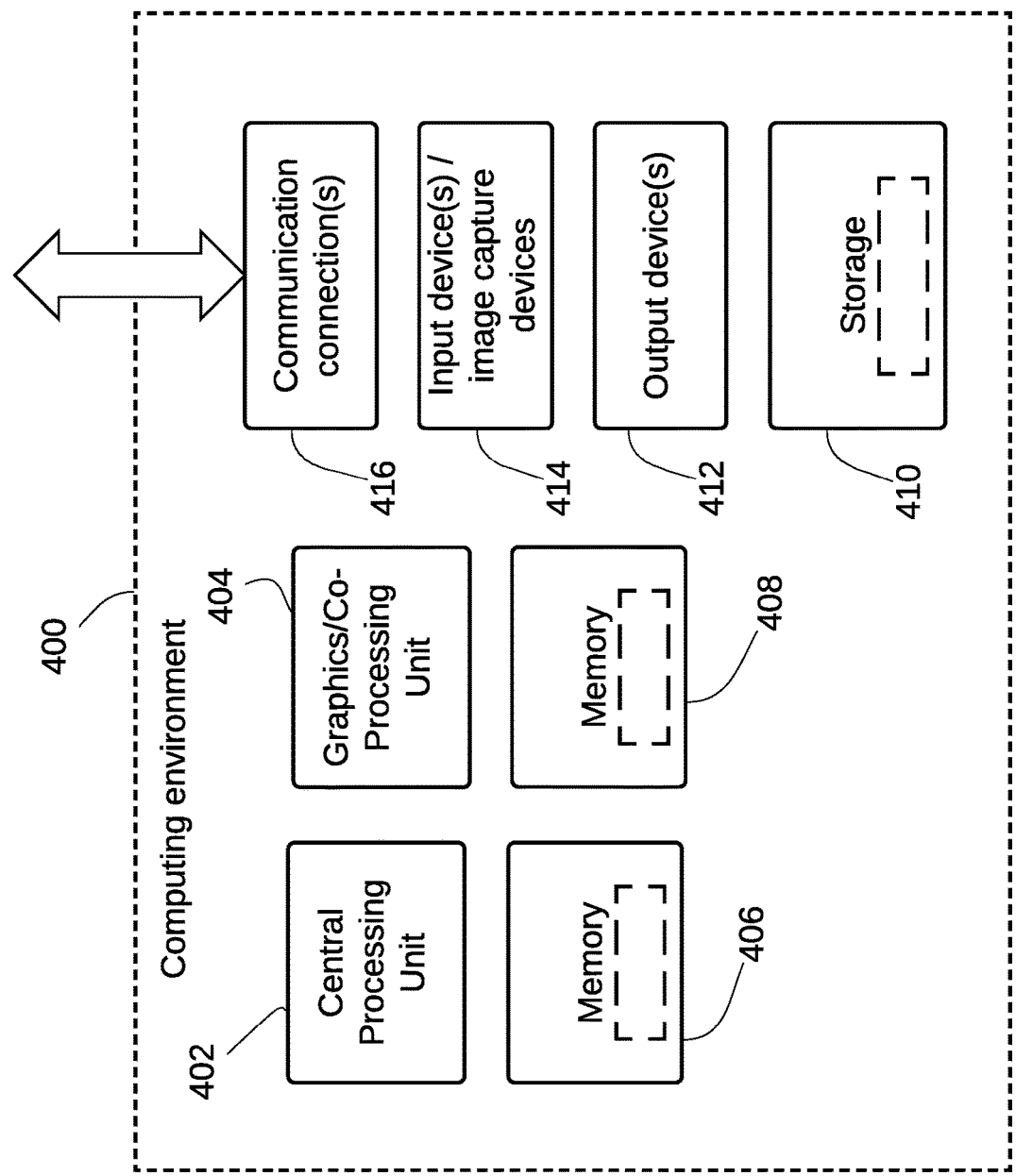
FIG. 4 illustrates a block diagram of hardware that may be employed in an implementation of the RPA systems disclosed herein.

FIG. 4 illustrates a block diagram of hardware that may be employed in an implementation of the RPA system as disclosed herein. FIG. 4 depicts a generalized example of a suitable general-purpose computing system 400 in which the described innovations may be implemented in order to improve the processing speed and efficiency with which the computing system 400 operates to perform the functions disclosed herein. With reference to FIG. 4 the computing system 400 includes one or more processing units 402, 404 and memory 406, 408. The processing units 402, 406 execute computer-executable instructions. A processing unit can be a general-purpose central processing unit (CPU), processor in an application-specific integrated circuit (ASIC) or any other type of processor. The tangible memory 406, 408 may be volatile memory (e.g., registers, cache, RAM), non-volatile memory (e.g., ROM, EEPROM, flash memory, etc.), or some combination of the two, accessible by the processing unit(s). The hardware components in FIG. 4 may be standard hardware components, or alternatively, some embodiments may employ specialized hardware components to further increase the operating efficiency and speed with which the system 100 operates. The various components of computing system 400 may be rearranged in various embodiments, and some embodiments may not require nor include all of the above components, while other embodiments may include additional components, such as specialized processors and additional memory.

Computing system 400 may have additional features such as for example, storage 410, one or more input devices 414, one or more output devices 412, and one or more communication connections 416. An interconnection mechanism (not shown) such as a bus, controller, or network interconnects the components of the computing system 400. Typically, operating system software (not shown) provides an operating system for other software executing in the computing system 400, and coordinates activities of the components of the computing system 400.

The tangible storage 410 may be removable or non-removable, and includes magnetic disks, magnetic tapes or cassettes, CD-ROMs, DVDs, or any other medium which can be used to store information in a non-transitory way, and which can be accessed within the computing system 400. The storage 410 stores instructions for the software implementing one or more innovations described herein.

The input device(s) 414 may be a touch input device such as a keyboard, mouse, pen, or trackball, a voice input device, a scanning device, or another device that provides input to the computing system 400. For video encoding, the input device(s) 414 may be a camera, video card, TV tuner card, or similar device that accepts video input in analog or digital form, or a CD-ROM or CD-RW that reads video samples into the computing system 400. The output device(s) 412 may be a display, printer, speaker, CD-writer, or another device that provides output from the computing system 400.

The communication connection(s) 416 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for executing automation tasks, the method comprising:
    storing a first user credential, for accessing a first application, to a credential storage, the first user credential corresponding to an initial credential required for a multi-factor authentication protocol implemented by the first application for a user to access the first application;
    storing, for a robotic process automation system via at least one network, a bot that is configured to perform one or more programmed tasks, at least one or more of the programmed tasks including accessing the first application using the first user credential and a second user credential, and including interacting with the first application on behalf of the user;
    deploying the bot to a client computing device via the at least one network, wherein the bot is configured to operate on the client computing device and initiate interaction with the first application;
    receiving, from the bot operating on the client computing device, a first request for the first user credential;
    responding to the first request from the bot by retrieving the first user credential from the credential storage and providing the first user credential to the bot;
    subsequently receiving, from the bot operating on the client computing device, a second request for the second user credential; and
    responding to the second request from the bot by obtaining the second user credential from the credential storage or a third party service, and providing the second user credential to the bot.

2. The computer-implemented method of claim 1 wherein the responding to the second request from the bot comprises retrieving the second user credential from the credential storage.

3. The computer-implemented method of claim 1 wherein the responding to the second request from the bot comprises generating a time-based one-time password from a key stored in the credential storage, wherein the time-based one-time password corresponds to the second user credential.

4. The computer-implemented method of claim 1 wherein the responding to the second request from the bot comprises retrieving the second user credential from a second application which has received the second user credential from the third party service.

5. The computer-implemented method of claim 4 wherein the method further comprises:
    providing the second user credential to a mobile device associated with the first user wherein the second application executes on the mobile device to receive the second user credential from the third party service.

6. The computer-implemented method of claim 1 wherein the second user credential comprises an answer to a question posed by the first application.

7. The computer-implemented method of claim 1 wherein the responding to the second request from the bot comprises obtaining a time-based one-time code, wherein the time-based one-time password corresponds to the second user credential.

8. The computer-implemented method of claim 1 wherein the responding to the second request from the bot comprises obtaining the second user credential from the third party service.

9. The computer-implemented method of claim 8 wherein the third party service is an access management service.

10. A robotic process automation system, comprising:
    data storage for storing at least:
        a set of task processing instructions operable to interact at a user level with one or more user level applications, wherein the set of task processing instructions is encoded to interact with a multi-factor authentication provider; and
        credentials, wherein at least some of the credentials are used to satisfy multi-factor authentication protocols required by the one or more user level applications;
    a server processor operatively coupled to the data storage and configured to execute instructions that when executed cause the server processor to at least:
        respond to a request to deploy the set of task processing instructions by deploying the set of task processing instructions;
        respond to a first request from the set of task processing instructions operating on the client computing device to provide a first credential associated with a user to enable the set of task processing instructions to login to a first application, by retrieving from the data storage the first credential associated with the user that corresponds to the first application and providing the first credential to the set of task processing instructions; and after responding to the first request, respond to a second request from the set of task processing instructions operating on the client computing device to provide a second credential associated with the user to enable the set of task processing instructions to login to the first application, by retrieving the second credential associated with the user that correspond to the first application and providing the second credential to the set of task processing instructions.

11. The robotic process automation system of claim 10 wherein the server processor responds to a second request by retrieving the second credential associated with the user that corresponds to the first application from the data storage and providing the second credential associated with the user to the set of task processing instructions.

12. The robotic process automation system of claim 10 wherein the server processor responds to a second request by retrieving the second credential from a second application which has received the second credential from a third party application and providing the second credential associated with the user to the set of task processing instructions.

13. The robotic process automation system of claim 12 wherein the server processor provides the second application to a mobile device associated with the user wherein the second application executes on the mobile device associated with the user to receive the second credential from the third party application.

14. The robotic process automation system of claim 12 wherein the retrieving the second credential from a second application comprises:
retrieving a user credential from the data storage;
accessing the second application with the user credential; and
retrieving the second user credential from the second application.

15. The robotic process automation system of claim 14 wherein the second application comprises an e-mail application.

16. The robotic process automation system of claim 14 wherein the second user credential comprises an answer to a question posed by the first application.

17. A non-transitory tangible storage medium, having stored thereupon one or more program modules comprising computer-executable instructions for execution on a computer system, the computer-executable instructions causing the computer system to:
operate a bot on a client computing device;
access, via the bot, a first application on behalf of a user, the first application configured to operate on the client computing device;
receive, from the bot operating on the client computing device, a first request from the first application for a first user credential of the user;
respond to the first request from the first application for a first user credential of the user by requesting the first user credential of the user that corresponds to the first application to be provided from a credential storage that securely stores user credentials for a plurality of users, and then providing the first user credential to the first application;
subsequently receive, from the bot operating on the client computing device, a second request from the first application for a second user credential; and
respond to second request from the first application for a second user credential of the user by requesting the second user credential of the user to be provided, and then providing the second user credential to the first application.

18. The non-transitory tangible storage medium of claim 17 wherein the second user credential is acquired by a second application, and then provided to the first application.

19. The non-transitory tangible storage medium of claim 17 wherein the first user credential and the second user credential together provide multi-factor authentication of the user to the first application.

20. The non-transitory tangible storage medium of claim 17 wherein the second credential corresponds to a one-time password.

21. The non-transitory tangible storage medium of claim 17 wherein the second user credential is acquired by a multi-factor authentication provider.

22. The non-transitory tangible storage medium of claim 21 wherein the second credential corresponds to a code transmitted via email by the multi-factor authentication provider to an email account associated with the first user, wherein the second application corresponds to an email application that operates the email account associated with the first user.

23. The non-transitory tangible storage medium of claim 21 wherein the second credential corresponds to a code transmitted via SMS by the multi-factor authentication provider to a mobile device associated with the first user, wherein the second application corresponds to a listener application executing on the mobile device associated with the user that recognizes an SMS message from the multi-factor authentication provider and extracts the second credential from the SMS message.

24. The non-transitory tangible storage medium of claim 21 wherein the multi-factor authentication provider is a network-based access management service provider.

* * * * *